United States Patent
Sawada

(10) Patent No.: US 7,694,206 B2
(45) Date of Patent: Apr. 6, 2010

(54) RECEPTION METHOD, RECEPTION APPARATUS, AND PROGRAM FOR DECODING AN ERROR CORRECTION CODE USING SOFT-DECISION VALUE

(75) Inventor: Manabu Sawada, Yokohama (JP)

(73) Assignee: DENSO CORPORATION, Kariya (JP)

( * ) Notice: Subject to any disclaimer, the term of this patent is extended or adjusted under 35 U.S.C. 154(b) by 248 days.

(21) Appl. No.: 11/898,937

(22) Filed: Sep. 18, 2007

(65) Prior Publication Data

US 2008/0120528 A1 May 22, 2008

(30) Foreign Application Priority Data

Nov. 21, 2006 (JP) ............................. 2006-314353

(51) Int. Cl.
*H03M 13/00* (2006.01)
(52) U.S. Cl. ...................................... 714/780; 714/755
(58) Field of Classification Search ................. 714/755, 714/780; 375/298, 240.27
See application file for complete search history.

(56) References Cited

U.S. PATENT DOCUMENTS

| 5,566,191 | A | 10/1996 | Ohnishi et al. |
| 5,621,764 | A | 4/1997 | Ushirokawa et al. |
| 6,990,627 | B2 * | 1/2006 | Uesugi et al. ............... 714/794 |
| 7,020,459 | B2 * | 3/2006 | Nagayasu ................. 455/414.1 |
| 7,103,107 | B2 * | 9/2006 | Matsunaga et al. .......... 375/262 |
| 7,123,667 | B2 * | 10/2006 | Nagayasu .................... 375/316 |
| 7,430,257 | B1 * | 9/2008 | Shattil ........................ 375/347 |
| 2004/0174848 | A1 | 9/2004 | Takayama et al. |
| 2006/0172716 | A1 | 8/2006 | Yoshii et al. |

FOREIGN PATENT DOCUMENTS

| EP | 1 054 541 | 9/1999 |
| JP | A-2001-257604 | 9/2001 |
| JP | A-2001-274778 | 10/2001 |

* cited by examiner

*Primary Examiner*—Esaw T Abraham
(74) *Attorney, Agent, or Firm*—Posz Law Group, PLC

(57) ABSTRACT

A reception apparatus, method and a program using the reception method are provided to prevent degradation of reception quality due to interference. In a reception apparatus, an ADC samples data $r^I_q[k]$ and $r^Q_q[k]$. Based on the sampled data, a level detector finds an interference evaluation value $C_c[l]$ for each OFDM symbol by counting the number of times one of the data $r^I_q[k]^q$ and $r^Q_q[k^q]$ is clipped to the maximum output range of the ADC. When the interference evaluation value $C_c[l]$ is greater than or equal to an interference decision value $th_c$, a weighting control section corrects a soft-decision value $w_{l,m,n}$ by multiplying it by a weighting factor $\gamma_c$ so as to decrease contribution of an error correction code to decoding.

19 Claims, 7 Drawing Sheets

FIG. 7
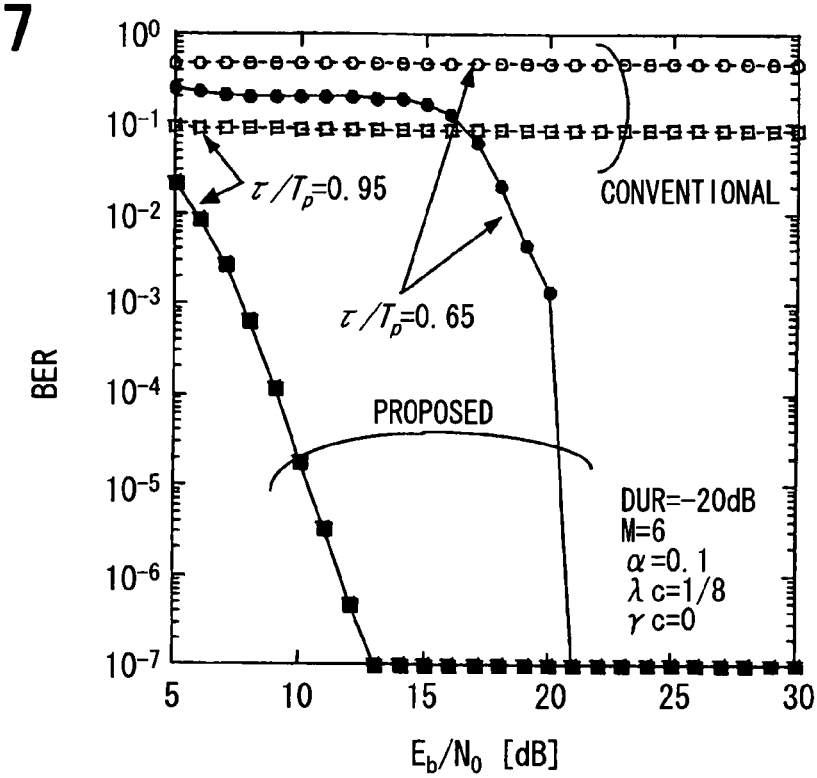
FIG. 8A
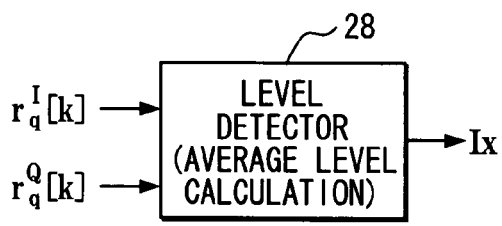
FIG. 8B
| LEVEL | WEIGHT |
|---|---|
| I1 | $\gamma 1$ |
| I2 | $\gamma 2$ |
| I3 | $\gamma 3$ |
| ⋮ | ⋮ |
| Ix | $\gamma x$ |
| ⋮ | ⋮ |

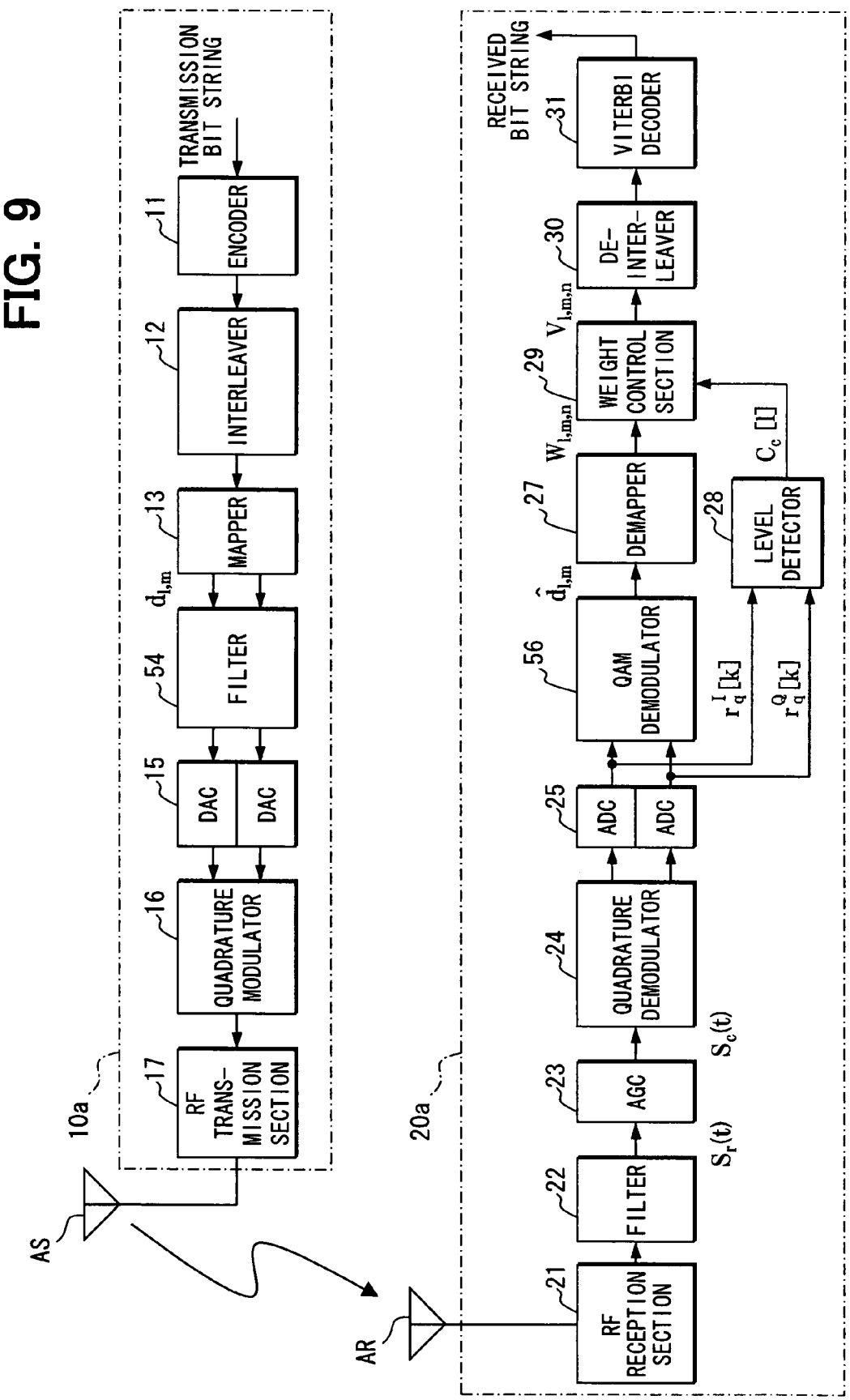

RECEPTION METHOD, RECEPTION APPARATUS, AND PROGRAM FOR DECODING AN ERROR CORRECTION CODE USING SOFT-DECISION VALUE

CROSS REFERENCE TO RELATED APPLICATION

The present invention is related to and claims priority from Japanese Patent Application No. 2006-314353 the contents of which are incorporated herein by reference.

BACKGROUND OF THE INVENTION

1. Field of the Invention

The present invention relates to a reception method for decoding, using a soft-decision value, a recovered bit stream that was encoded for transmission using an error correction code and further relates to a reception apparatus and a program using the reception method.

2. Description of the Background Art

As is conventionally known, a digital wireless communication system such as a wireless local area network (LAN) transmits and receives packet data between multiple communication devices according to wireless communication once network access is established. One contention-based access control method used for accessing a digital wireless communication system is the so-called carrier sense multiple access (CSMA) method.

When transmitting data based on a CSMA method, a communication device detects or senses the presence of a carrier on a corresponding channel used for communication with a destination communication device. When the channel is idle, that is, when no carrier is detected, the device transmits data. When the channel is busy, that is, when a carrier is detected, the device waits and, when the channel becomes idle, the data is then transmitted. In the above-described manner, the CSMA method provides method of control so as to prevent collisions, that is, interference between the transmitted signal and a signal transmitted from other communication devices.

However, even when providing access control such as by using a CSMA method, a digital wireless communication system cannot completely avoid interference because of the so-called hidden terminal problem, which is associated with a condition that is incapable of being detected through carrier sense methods as described.

Let us suppose that terminals B and C are situated within a communication range associated with a terminal A, and are outside of each other's communication range. In the present example, terminals B and C cannot detect each other despite performing carrier sensing. While terminal B is transmitting data to terminal A, terminal C may also transmit data to terminal A creating interference between the signals to be received by terminal A from both terminal B and terminal C. Thus to address the hidden terminal problem other method must be used, such as coding or the like.

Convolution coding is a known coding method used for improving the performance of digital wireless communication system and the accuracy of signal recovery despite the presence or occurrence of interference. Viterbi decoding is widely used as a decoding method featuring an enhanced error correction capability.

Viterbi decoding estimates a state transition of an encoder based on data extracted from a received signal. Based on a priori knowledge of the possible code states, the most likely or maximum likelihood state transition is established in order to estimate the actual code value of the received data extracted from a transmitted signal. A Hamming distance between a received code and a candidate code is generally used for quantitatively representing likelihood of the prospective state transition. Hard and soft decisions are known for finding the likelihood. The hard decision represents a received signal using 0 and 1 in binary. The soft decision represents a received signal using multiple values corresponding to amplitudes of the received signal.

A decision value generated from the hard decision has the same effect on decoding regardless of the reliability associated with the decision value itself. In contrast, a decision value generated from a soft decision has a little effect on decoding when the decision value itself is determined to be less reliable. Accordingly, use of soft decisions in decoding ensures higher reliability than the use of hard decisions. The following description uses the term "soft-decision value" to signify a value or a decision value used in soft decision making to represent the likelihood.

As described in Japanese Unexamined Publication No. 2001-257604 A ("JP-A-2001-257604"), for example, the proposed control method uses characteristics of the soft decision during decoding. When a soft-decision value is generated during the occurrence of interference, the value is replaced by a value representing a zero likelihood. In the above described manner, the proposed method prevents the soft-decision value obtained during interference from contributing to the Viterbi decoding result.

The conventional apparatus described in JP-A-2001-257604 assumes the presence of a high-power interference wave periodically transmitted from another system, such as a weather radar, and uses interference wave characteristics to detect an interference occurrence period. The apparatus requires an additional special detection circuit for detecting an interference wave and is thus relatively large and expensive.

SUMMARY OF THE INVENTION

In consideration of the foregoing, the present invention provides a reception method, an object of which is to easily prevent the degradation of reception quality due to interference. The present invention further provides a reception apparatus and a program using the reception method.

To achieve the above-mentioned object, a reception method according to a first aspect of the invention receives a signal generated by modulating a data string coded with an error correction code and interleaved for each packet as a transmission unit so that one symbol represents one of a bit and a plurality of bits. It should be noted that the interleaving technique in accordance with various exemplary embodiments is performed across multiple symbol periods with different timings. The received signal is demodulated and a soft-decision value used for decoding the error correction code is generated. The soft-decision value is de-interleaved. The error correction code is decoded using the de-interleaved soft-decision value.

A reception level evaluation step calculates an evaluation value for evaluating a reception level of the received signal detected more than once during a predetermined measurement time based on the reception level. A correction step corrects a soft-decision value generated at the demodulation step so as to decrease contribution of the error correction code to decoding when the evaluation value indicates an interference occurrence.

The reception method according to the invention de-interleaves a soft-decision value string resulting from the demodulation step across multiple symbol periods with different timings. A soft-decision value is demodulated and de-interleaved from a signal received during a symbol period at a given timing. Thus, even though the interference occurs during the symbol period, soft-decision values are arranged so as not concentrate on a point in the packet. Accordingly, the reception method according to the invention can appropriately decode an error correction code and improve the communication quality.

The reception method according to the invention determines an interference occurrence using an evaluation value calculated based on a reception level of a received signal detected more than once during a predetermined measurement time. The method reduces or eliminates the need to add a special circuit for detecting interference and can simplify the apparatus configuration. The method can detect not only periodically occurring interference but also randomly occurring interference.

In a reception apparatus according to a second aspect of the invention, a demodulation means demodulates a received signal and generates a soft-decision value used for decoding the error correction code. A de-interleave means de-interleaves a soft-decision value generated by the demodulation means. A decode means decodes the error correction code using a de-interleaved soft-decision value string. The de-interleave means de-interleaves a data string such as the soft-decision value string, that is interleaved across multiple symbol periods with different timings. The de-interleave means preferably specifies the number of symbol periods so as to contain the entire packet.

A reception level evaluation means calculates an evaluation value for evaluating a reception level of the received signal detected more than once during a predetermined measurement time based on the reception level. A correction means corrects a soft-decision value generated by the demodulation means so as to decrease the contribution of the error correction code to decoding when an evaluation value calculated by the reception level evaluation means indicates an interference occurrence.

The reception apparatus according to the invention can be used to realize the reception method according to a first aspect of the invention. The reception apparatus can provide the same effect as that provided by the reception method.

When a soft-decision value is generated from a received signal in the symbol period during which interference occurs, the soft decision value is not concentrated on one symbol period and is reliably distributed across the entire packet making it possible to further improve decoding reliability for the error correction code.

The reception level evaluation means may find an evaluation value equivalent to a ratio at which, or otherwise proportional to, a reception level detected during the measurement time exceeds a predetermined excess threshold value. The reception level evaluation means may find the evaluation value equivalent to an average value for a reception level detected during the measurement time.

The reception level evaluation means preferably configures or otherwise converts a sample count for a reception level detected during the measurement time to an integral multiple of a sample count needed for demodulation, for example, in the demodulation means such that the evaluation value can be accurately found. The measurement time is preferably equal to one symbol period so as to be able to determine the presence or absence of interference for each symbol period.

In some cases a symbol period may be longer than a minimum necessary time, such as a necessary evaluation time, needed for sufficiently and accurately evaluating a received signal's amplitude. In such case, the measurement time may be shorter than the necessary evaluation time. In a case where a symbol period is shorter than the necessary evaluation time, the measurement time is preferably configured or otherwise converted to be an integral multiple of the necessary evaluation time.

The correction means may determine interference when the evaluation value is greater than or equal to a predetermined interference decision value, for example. The correction means corrects the soft-decision value by multiplying it by a weighting factor. In the present example, the correction means may variably configure the weighting factor in accordance with a table specifying correspondence between the evaluation value and the weighting factor. Since the soft-decision value can be finely corrected, it is possible to further improve the accuracy of decoding based on the soft-decision value. Accordingly, the correction means preferably corrects the soft-decision value during each of the symbol periods.

In the reception apparatus according to the present embodiment, the demodulation means may demodulate a received signal transmitted in accordance with an orthogonally frequency division-multiplexed (OFDM) procedure using as many as M subcarriers, where M is an integer with a value greater than or equal to 2.

In the present case, the reception apparatus receives data equivalent to as many as M non-OFDM symbols at a time during one OFDM symbol period. However, the reception level evaluation means is similarly capable of evaluation based on a reception level detected during the one symbol period for OFDM.

In the reception apparatus according to the invention, for example, the demodulation means may demodulate a received signal that is modulated according to quadrature amplitude modulation (QAM) or phase shift keying (PSK) modulation based on a symbol constellation having, for example, $2^N$ points, where N is a positive integer. Alternatively, the demodulation means may demodulate a received signal that is first modulated according to QAM or PSK based again on a symbol constellation having, for example, $2^N$ points, which is then is multiplexed according to OFDM.

It should be noted that in accordance with a third aspect, the above-mentioned soft-decision value correction method may be provided as an article of manufacture, for example, as a program that allows a computer to perform various procedures such as steps included in the exemplary method described herein. The program may be carried or otherwise stored as instructions on a computer-readable medium such as a network or a computer readable recording medium and may be loaded to a computer system as needed. Accordingly, the program may be downloaded to the computer system via the recording medium, the network or the like. The recording medium may be portable or may be built in the computer system.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 7 is a graph illustrating an exemplary simulation result showing BER characteristics as a function of $E_b/N_0$;

FIG. 8A is a diagram illustrating an exemplary level detector;

FIG. 8B is a diagram illustrating an exemplary table for setting weight counts in the level detector of FIG. 8A; and FIG. 9 is a block diagram illustrating a transmission apparatus and a reception apparatus included in a communication system according to an alternate exemplary embodiment.

DETAILED DESCRIPTION OF THE PREFERRED EMBODIMENTS

Embodiments of the present invention will be described in further detail with reference to the accompanying drawings.

Figure 1:
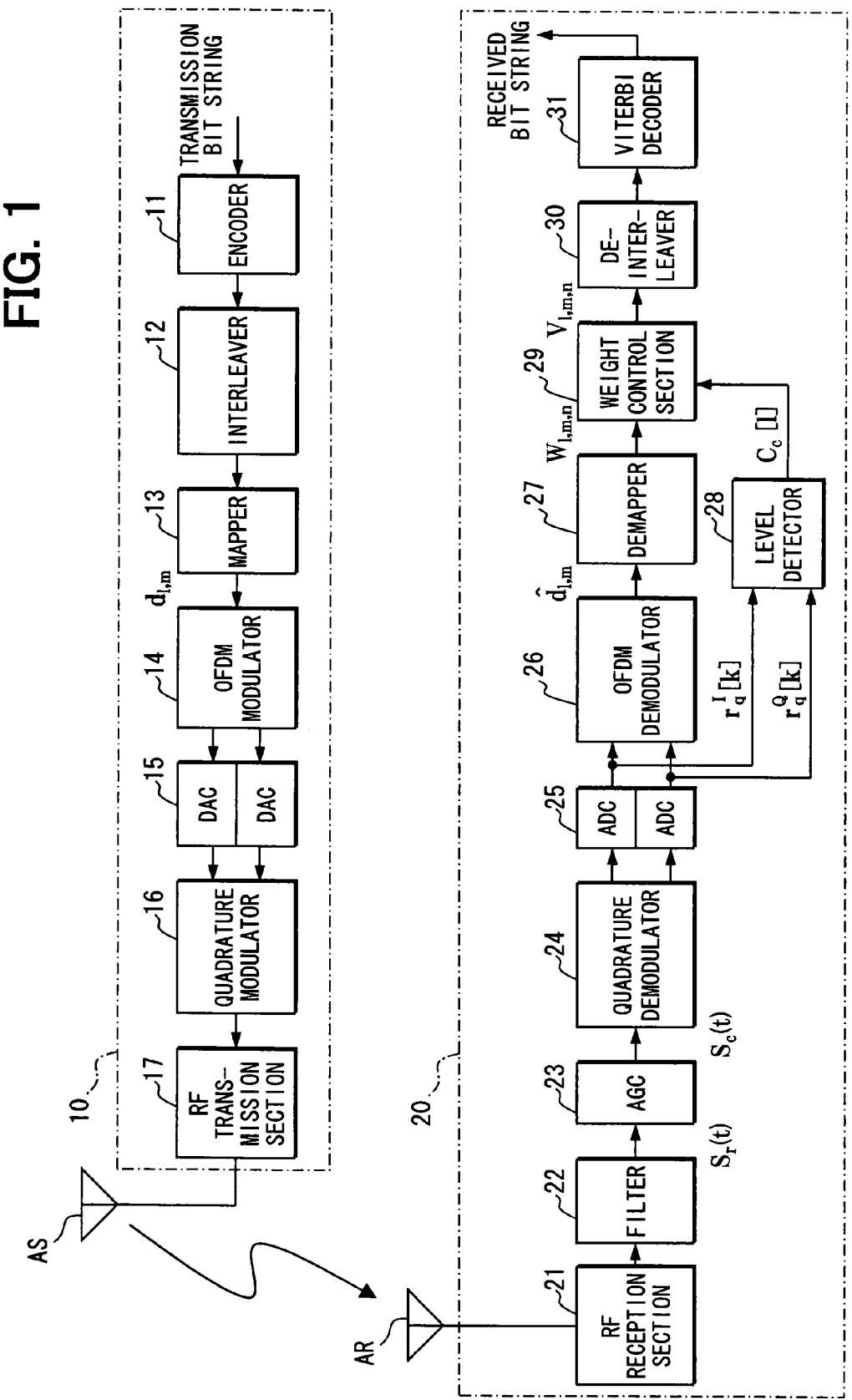
FIG. 1 is a block diagram illustrating a transmission apparatus and a reception apparatus included in a communication system according to an exemplary embodiment.

As will be apparent from FIG. 1, the configuration of a transmission apparatus 10 and a reception apparatus 20 included in, for example, a packet wireless communication system according to an exemplary embodiment includes various portions as will be described hereinafter.

The transmission apparatus 10 includes an encoder 11 that encodes a transmission bit string with an error correction code, or specifically a convolution code to produce coded strings. An interleaver 12 organizes, sorts, or otherwise interleaves the order of code strings output from the encoder 11. A mapper 13 maps an output from the interleaver 12 to a number of symbol points equivalent to $2^N$ QAM symbol points in units of N bits. An OFDM modulator 14 performs an inverse fast-Fourier transform (FFT) by maintaining correspondence between output d, which is also referred to hereinafter as a primary modulation symbol, from the mapper 13 and as many as M subcarriers used for orthogonal frequency division multiplexing (OFDM) to be described in greater detail hereinafter, where M is an integer greater than or equal to 2. The OFDM modulator 14 thus generates two data strings representing in-phase (I) and quadrature (Q) components of an OFDM symbol, which can also be referred to hereinafter as a secondary modulation symbol. A digital-to-analog converter (DAC) 15 converts the two data strings generated by the OFDM modulator 14 from digital to analog to generate two baseband signals representing the I and Q components. A quadrature modulator 16 generates a transmission signal by mixing the two baseband signals generated by the DAC 15. An RF transmission section 17 upconverts the transmission signal generated by the quadrature modulator 16 into a signal of a predetermined frequency band and transmits the signal via a transmission antenna AS.

The reception apparatus 20 includes an RF reception section 21 that receives a signal transmitted from the transmission apparatus 10, via the reception antenna AR and downconverts the signal into a signal of a frequency band appropriate for signal processing. A filter 22 removes an unnecessary frequency component from the output from the RF reception section 21. An automatic gain control (AGC) amplifier 23 amplifies a received signal output from the filter 22 by automatically adjusting a gain so that an average power for the amplified received signal matches a predetermined target value. A quadrature demodulator 24 generates two baseband signals representing the I and Q components from the received signal amplified by the AGC amplifier 23. An analog-to-digital converter (ADC) 25 samples the two baseband signals generated from the quadrature demodulator 24 to generate two data strings representing the I and Q components.

The reception apparatus 20 further includes an OFDM demodulator 26 that performs an FFT on two data strings generated from the ADC 25 to demodulate the data strings into primary modulation symbols corresponding to as many as M subcarriers. A demapper 27 generates an n-bit soft-decision value based on the primary modulation symbol demodulated by the OFDM demodulator 26. A level detector 28 generates an evaluation value for evaluating a reception level of the received signal based on the two data strings generated from the ADC 25. A weighting control section 29 determines a weighting factor based on the evaluation value generated from the level detector 28 and multiplies the weighting factor by each soft-decision value generated from the demapper 27 to generate a code string including the corrected soft-decision value. A de-interleaver 30 sorts the code string generated from the weighting control section 29 according to the original sequence. A Viterbi decoder 31 performs maximum-likelihood decoding based on an output from the de-interleaver 30 to generate a received bit string.

It should be noted that in accordance with an exemplary embodiment, various portions of the above described transmission apparatus 10 and reception apparatus 20 can be performed by a computer according to a predetermined program. For example, the above described portions such as: the encoder 11, the interleaver 12, the mapper 13, and the OFDM modulator 14 in the transmission apparatus 10; and the OFDM demodulator 26, the demapper 27, the level detector 28, the weighting control section 29, the de-interleaver 30, and the Viterbi decoder 31 in the reception apparatus 20 can be embodied as an article of manufacture where, for example, one or more processes or procedures execute in accordance with instructions read from a computer readable medium including a memory device such as a compact disc(CD) memory, a magnetic disk memory, a flash memory, a universal serial bus (USB) memory or the like, by a suitable computer or processor such as a high-speed signal processor, reduced instruction set computer (RISC) processor, general purpose processor, custom processor, programmable logic array or the like, or a combination of the aforementioned processors or other processors, or the like as would be appreciated and understood by one of ordinary skill in the art. Alternatively, the computer readable medium can include a network and therefore the instructions can be readable by the exemplary processor through an interface to the network, or the like.

(Interleaver and De-interleaver)

Figure 2A:
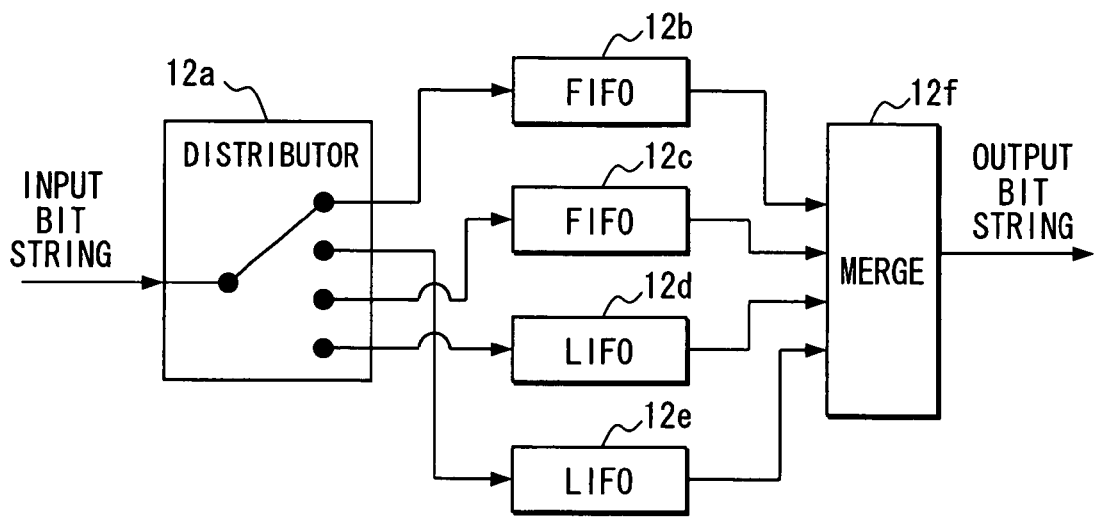
FIG. 2A is a block diagram illustrating an exemplary encoder.

As can be seen with reference to FIG. 2A, the interleaver 12 includes first-in-first-out (FIFO) memories 12b and 12c, which are configured to read data in the order of writing. Interleaver 12 further includes last-in-first-out (LIFO) memories 12d and 12e, which are configured to read data in the reverse order of writing. A distributor 12a distributes bits included in an input bit string, such as a data packet, output from the encoder 11 in a one-by-one manner to the respective memories, for example, in a predetermined order such as to FIFO 12b, then LIFO 12e, then FIFO 12c, and then LIFO 12d, whereupon the bits are written to the respective memories to which they are distributed. A merge circuit 12f successively reads the memories 12b through 12e. That is, the merge circuit 12f reads data that was written to the memories 12b through 12e as described above. To perform a successive read of the memories 12b through 12e, the merge circuit 12f first reads all of the data that was written to and stored in the FIFO 12b, then reads all of the data that was written to and stored in the FIFO 12c, then reads all of the data that was written to and stored in the LIFO 12d and finally reads all of the data that was written to and stored in the LIFO 12e. The entire contents of each of the memories 12b through 12e are successively read in order to generate an output bit string, arranged in the order of reading, to be supplied to the mapper 13.

As mentioned above, N denotes the number of bits for the primary modulation symbol; M denotes the number of OFDM subcarriers, that is, the number of primary modulation symbols contained in the secondary modulation symbol. M×N denotes the number of bits that can be transmitted in a one-symbol period. One packet is assumed to contain as many as L secondary modulation symbols. That is, one packet transmits M×N×L bits. The interleaver 12 uses the memories 12b through 12e to interleave relation between i and j as expressed in equation (EQ.1), where x[i] (i=0, 1, 2, . . . , MNL−1) denotes an input to the interleaver 12 and y[j] (j=0=0, 1, 2, . . . , MNL−1) denotes an output therefrom. Equation (EQ.2) expresses v.

$$j = \begin{cases} \frac{1}{4}i & v = 0 \\ \frac{1}{4}(4MLN - i - 3) & v = 1 \\ \frac{1}{4}(MLN + i - 2) & v = 2 \\ \frac{1}{4}(3MLN + i - 1) & v = 3 \end{cases} \quad \text{(EQ. 1)}$$

$$v = i \bmod 4 \quad \text{(EQ. 2)}$$

Figure 2B:
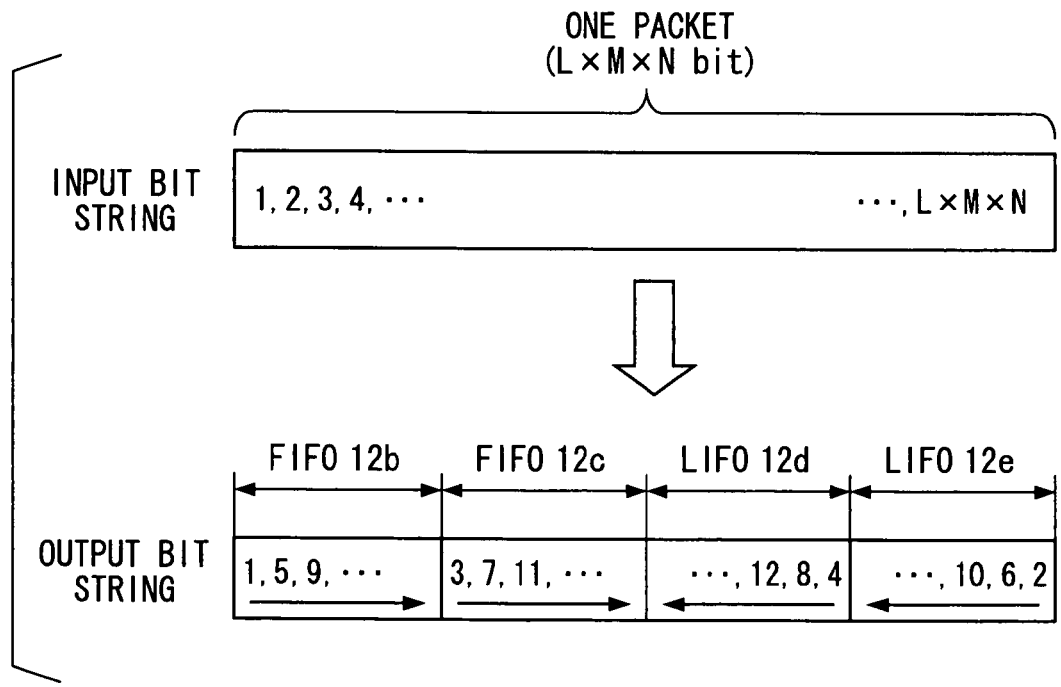
FIG. 2B is a diagram illustrating exemplary operation in accordance with the encoder of FIG. 2A.

Data is successively read from the memories 12b through 12e as follows. The FIFO 12b stores data corresponding to bits 1, 5, 9, and so on. The data are successively read in the order they are stored. The FIFO 12c stores data corresponding to bits 3, 7, 11, and so on. The data are successively read in the order they are stored. The FIFO 12d stores data corresponding to bits 4, 8, 12, . . . , and so on, which data are successively read in the reverse order they are stored. Finally, the FIFO 12e stores data corresponding to bits 2, 6, 10, . . . , and so on, which data are successively read in the reverse order they are stored. As a result, an input bit string is arranged into an output bit string as shown in FIG. 2B. It should be noted that in accordance with various exemplary embodiments, the memories 12b through 12e can use any suitable FIFO and LIFO storage unit. Further, in addition to the above-described order of writing and reading, data can be written to or read from the memories 12b through 12e in any order.

As mentioned above, the interleaver 12 sorts or interleaves all the secondary modulation symbols contained in one packet. Accordingly, the de-interleaver 30 is configured to function in a manner that is reverse of the manner of interleaving used by the interleaver 12. The configuration of the de-interleaver 30 can be easily understood from the configuration of the interleaver 12 and therefore a description of the de-interleaver 30 is omitted for simplicity.

(Receiver Operation)

Let us suppose that $S_r(t)$ denotes a received signal whose band is restricted by the filter 22, and g(t) denotes a gain of the AGC amplifier 23. Equation (EQ.3) expresses received signal $S_c(t)$ amplified by the AGC amplifier 23.

$$S_c = g(t)S_r(t) \quad \text{(EQ. 3)}$$

The AGC amplifier 23 calculates a gain α, which is a constant that is based on the received electric power associated with, for example, a preamble contained in the beginning of a received signal such as a received packet to be demodulated. The AGC amplifier 23 amplifies signals using the gain α during a continuation time Tp for one packet.

Let us suppose: that $Re[S_c(t)]$ denotes a baseband signal representing the I component that the quadrature demodulator 24 generates by quadrature-demodulating the received signal $S_c(t)$; that $Im[S_c(t)]$ denotes a baseband signal representing the Q component; and that Ts denotes a sampling interval for the ADC 25. Then, equation (EQ.4) expresses $k^{th}$ data $r^I_q[k]$ sampled by the ADC 25 from the baseband signal $Re[S_c(t)]$. Equation (EQ.5) expresses $k^{th}$ data $r^Q_q[k]$ sampled from the baseband signal $Im[S_c(t)]$.

$$r^I_q[k] = q(Re[S_c(kT_s)]) \quad \text{(EQ. 4)}$$

$$r^Q_q[k] = q(Im[S_c(kT_s)]) \quad \text{(EQ. 5)}$$

Figure 3:
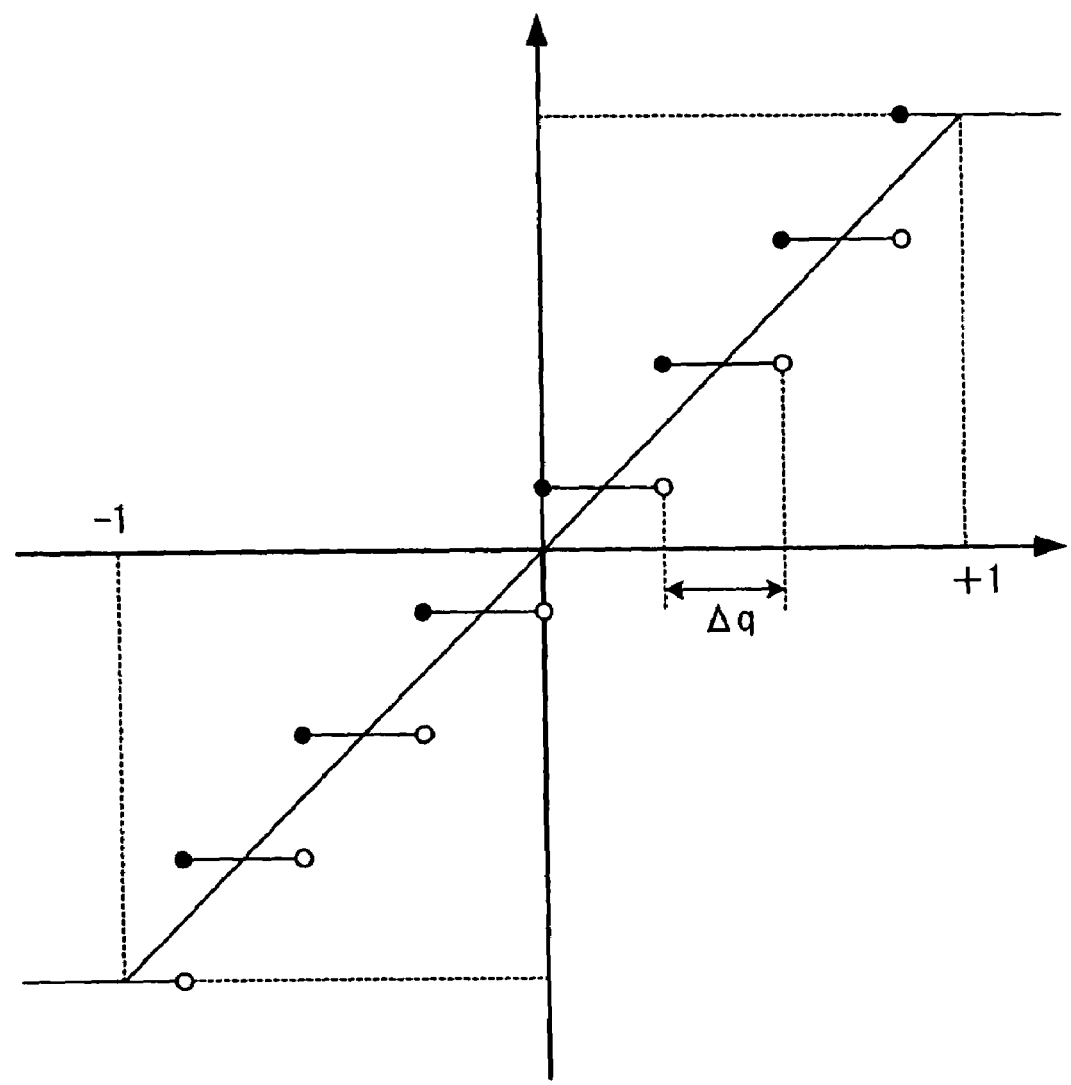
FIG. 3 is a graph illustrating characteristics of an exemplary analog-to-digital (A/D) converter.

Equation (EQ.6) defines q(x), a function representing input/output characteristics, such as the quantization or conversion characteristics, of the ADC 25, for example as illustrated in FIG. 3.

$$q(x) = \begin{cases} 1 & x \geq 1 \\ \left\lfloor \frac{x}{\Delta_q} \right\rfloor \Delta_q + \frac{\Delta_q}{2} & -1 \leq x < 1 \\ -1 & x < -1 \end{cases} \quad \text{(EQ. 6)}$$

where "⌊x⌋" is a maximum integer not exceeding x, and Δq is a quantization width.

It is assumed that $\hat{d}_{l,m}$ is a primary modulation symbol associated with the $m^{th}$ subcarrier and is the first OFDM symbol demodulated by the OFDM modulator based on the data string sampled from the baseband signals, where "$\hat{d}$" represents d"hat" as used, for example, in equation (EQ. 7) and equation (EQ. 8). The demapper 27 calculates a soft-decision value $w_{l,m,n}$ for the $n^{th}$ bit contained in the primary modulation symbol $\hat{d}_{l,m}$ according to the following equations.

$$w_{l,m,n} = \begin{cases} Re[\hat{d}_{l,m}] & n = 1 \\ Im[\hat{d}_{l,m}] & n = 2 \end{cases} \quad \text{(EQ. 7)}$$

$$w_{l,m,n} = \begin{cases} Re[\hat{d}_{l,m}] & n = 1 \\ -(Re[\hat{d}_{l,m}] - A) & n = 2 \\ Im[\hat{d}_{l,m}] & n = 3 \\ -(Im[\hat{d}_{l,m}] - A) & n = 4 \end{cases} \quad \text{(EQ. 8)}$$

where, in equation (EQ. 8), A denotes a threshold value specified for each subcarrier according to its amplitude.

Figure 4A:
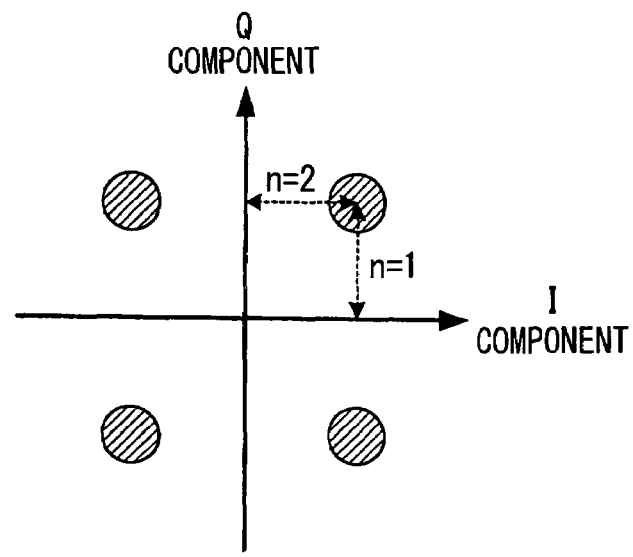
FIG. 4A is a diagram illustrating exemplary symbol constellation points for quadrature phase shift keying (QPSK)
Figure 4B:
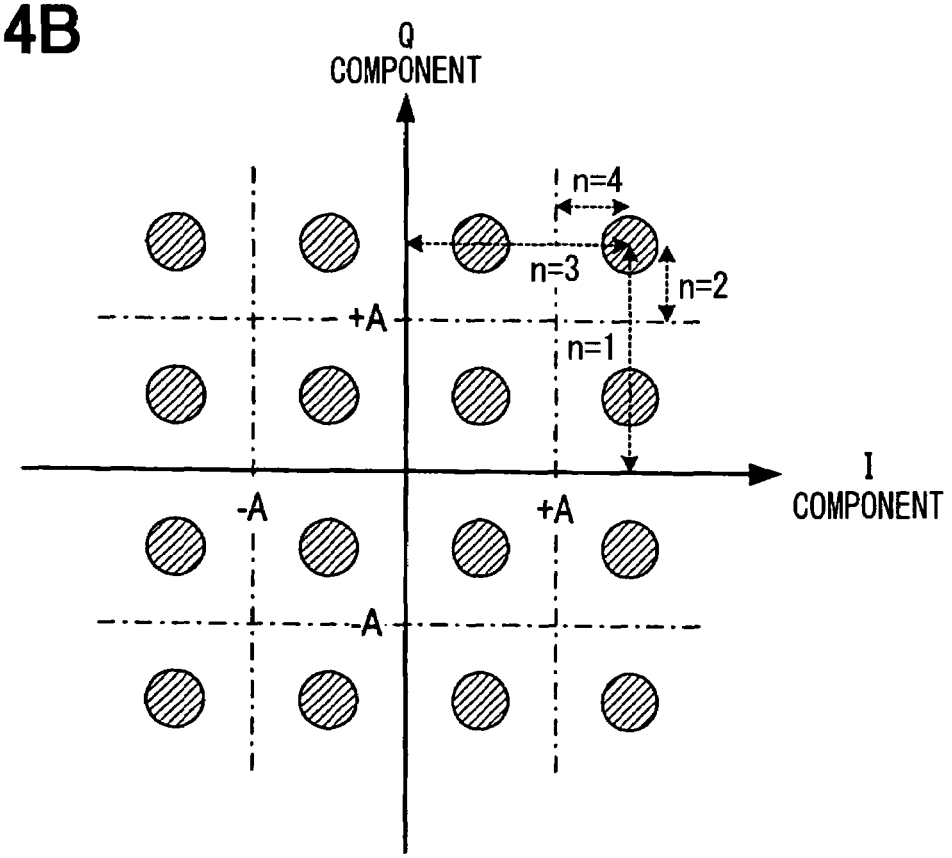
FIG. 4B is a diagram illustrating exemplary symbol constellation points for 16-point quadrature amplitude modulation (16QAM)

It should be noted that the expression shown in equation (EQ.7) uses QPSK (N=2) for generating the primary modulation symbol or modulating the subcarrier as illustrated, for example, in FIG. 4A, while the expression of equation (EQ.8) uses 16QAM (N=4) as illustrated, for example in FIG. 4B. It should be noted that other cases such as where N is not 2 or 4, can be easily analogized from the above noted equations. The method of calculating soft-decision values is not limited to the above-mentioned equations and any known method may be used for calculating soft decisions.

(Level Detector)

Figure 5:
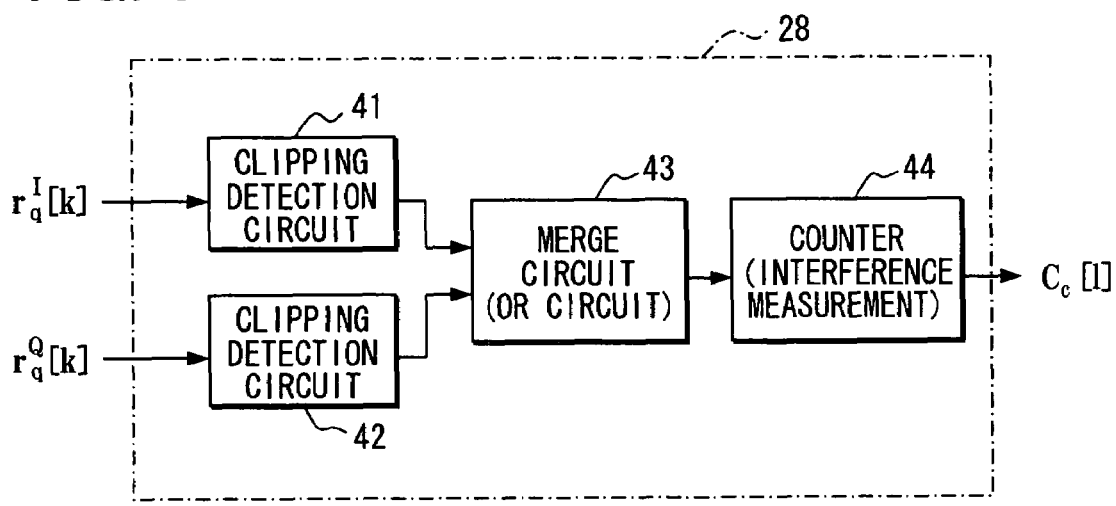
FIG. 5 is a block diagram illustrating an exemplary configuration of a level detector.

As shown in FIG. 5, the level detector 28 includes a clipping detection circuit 41 that detects whether or not data $r^I_q[k]$, which represents the I component generated from the ADC 25, is clipped to the maximum output range of the ADC 25, or otherwise reaches or exceeds an excess threshold value. A clipping detection circuit 42 detects whether or not data $r^Q_q[k]$, which represents the Q component generated from the ADC 25, is clipped to the maximum output range of the ADC 25. A merge circuit 43 outputs a pulse signal when at least one of the clipping detection circuits 41 and 42 detects clipping. A counter 44 counts, in units of OFDM symbols, a pulse signal output from the merge circuit 43 for each symbol period and outputs a count value as an interference evaluation value $C_c[l]$.

Let us suppose $K_s$, which is equal to $T/T_s$, is a sample count per OFDM symbol on the ADC 25, where T is the symbol period. Then, equation (EQ.9) can be used to express an output $e_c[k]$ from the merge circuit 43. Equation (EQ.10) then can be used to express interference evaluation value $C_c[l]$ as an output from the counter 44.

$$e_c[k] = \begin{cases} 1 & |r^I_q[k]| = 1 \text{ or } |r^Q_q[k]| = 1| \\ 0 & \text{otherwise} \end{cases} \quad (EQ. 9)$$

$$C_c[l] = \sum_{k=0}^{K_s-1} e_c[k + lK_s] \quad (EQ. 10)$$

It should be noted that data $r^I_q[k]$ and $r^Q_q[k]$ are assumed to be normalized such that the ADC 25 provides a maximum output range of 1. The sample count $K_s$ results from multiplying P by a minimum sample count needed for the process (FFT) of the OFDM modulator 26, where P is an integer greater than or equal to 2. It should also be noted that in accordance with various embodiments, the ADC 25 is configured to perform so-called over sampling.

(Weighting Control Section)

The weighting control section 29 performs a process shown in equation (EQ.11) for all soft-decision values $w_{l,m,n}$ generated from the first OFDM symbol.

$$v_{l,m,n} = \begin{cases} \gamma_c \cdot w_{l,m,n} & C_c[l] \geq th_c \\ w_{l,m,n} & \text{otherwise} \end{cases} \quad (EQ. 11)$$

When an interference evaluation value $C_c[l]$ generated from the level detector 28 is greater than or equal to a predetermined interference decision value $th_c$, the weighting control section 29 generates a corrected soft-decision value $v_{l,m,n}$ by multiplying a weighting factor $\gamma_c$ by the soft-decision value $W_{l,m,n}$ generated from the demapper 27. Otherwise, the weighting control section 29 uses the soft-decision value $w_{l,m,n}$ generated from the demapper 27 as the corrected soft-decision value $v_{l,m,n}$.

The interference decision value $th_c$ and the weighting factor $\gamma_c$ are experiment-based constants. Setting $\gamma_c=1$ corrects no soft-decision value. Decreasing $\gamma_c$ also decreases the soft-decision value likelihood. The decision value less contributes to decoding in the Viterbi decoder 31. Setting $\gamma_c=0$ zeros the soft-decision value likelihood, meaning that the soft-decision value does not contribute to decoding in the Viterbi decoder 31.

The de-interleaver 30 de-interleaves the corrected soft-decision value $v_{l,m,n}$. The value is then input to the Viterbi decoder 31 and is decoded into the received bit string.

(Simulation)

It should be noted that a computer simulation was conducted to calculate received bit error rate (BER) characteristics for evaluating effectiveness of the communication system according to various exemplary embodiments. The result is as follows.

Figure 6A:
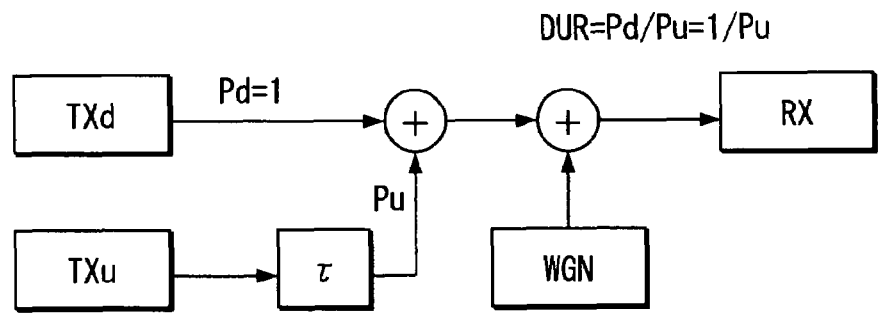
FIG. 6A is a diagram illustrating an exemplary simulation model.

In accordance with the simulation, using a packet interference model as shown in FIG. 6A, a reception apparatus RX receives a target signal packet Sd from a transmission apparatus TXd and an interference signal packet Su along with white Gaussian noise, which can be characterized as average white Gaussian noise (AWGN) having two-sided power spectrum density set to $N_0/2$, from an interferer such as a transmission apparatus TXu.

Figure 6B:
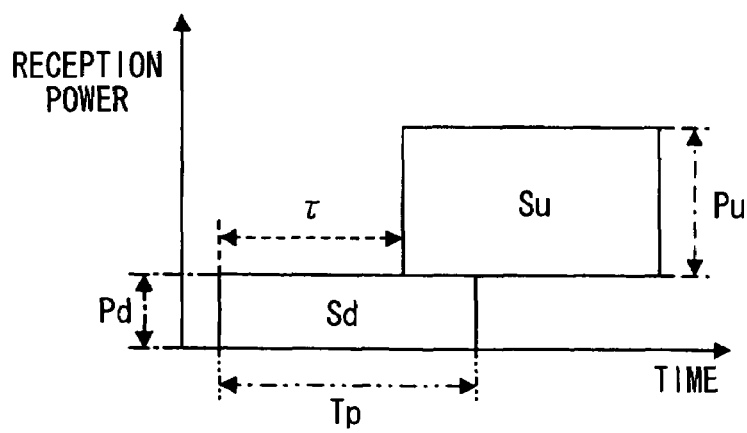
FIG. 6B is a graph illustrating signal power vs. time for the exemplary model in FIG. 6A.

As shown in FIG. 6B, the reception power Pd, which is set to 1 in the present example, denotes an average reception power for the target signal packet Sd, and Pu denotes an average reception power for the interference signal packet Su. A ratio of a target wave to an interference wave power is assumed to be DUR and is calculated as DUR=Pd/Pu=1/Pu. Reception of the interference signal packet Su starts with a delay of time "τ" after reception of the target signal packet Sd starts.

The transmission apparatus and the reception apparatus are conditioned as follows. The packet size is 200 OFDM symbols (L=200). A convolution code in the encoder 11 uses a constraint length K=7 and a coding ratio R=½. The interleave size for the interleaver 12 and the de-interleaver 30 is the same as the packet size, 200 OFDM symbols. The mapper 13 and the demapper 27 use modulation of 16QAM (N=4) and the number of subcarriers set to M=64. The ADC 25 uses six quantization bits.

Further, the ADC 25 assumes the sample count Ks per OFDM symbol (symbol period T) and the AGC amplifier 23 uses a fixed gain (g(t)=α), where $\lambda c=th_c/Ks=\frac{1}{8}$, $\gamma_c=0$, and α=0.1.

Under these conditions, for example with DUR=−20 dB, a result of BER characteristics with reference to $E_b/N_0$, which is the ratio of the transmitted signal energy per bit to the noise spectrum density, can be seen in FIG. 7.

In FIG. 7, Tp denotes a packet propagation time. Black circles indicate respective ratios of the time during which an exemplary packet is determined to be free from interference for the conditions of τ/Tp=0.65 and τ/Tp=0.95. For comparison, white circles indicate those with weight count $\gamma_c=1$ (no soft-decision value corrected).

As clearly understood from FIG. 7, the weight count $\gamma_c=1$ does not improve the BER even though the $E_b/N_0$ increases. The communication system according to the present embodiment improves the BER as the $E_b/N_0$ increases. When $E_b/N_0>20$ dB, the system ensures BER$\leq 10^{-7}$, i.e., a practical level for both τ/Tp set to 0.65 and 0.95. An interference influence is greatly reduced.

The communication system according to the present embodiment is fully effective even when the time duration subject to interference reaches approximately one third of the packet length (τ/Tp=0.65). The system can greatly improve an applicable scope compared to a conventional apparatus compliant with a relatively short interference (pulse).

(Effect)

As mentioned above, the communication system according to the present embodiment interleaves a data string transmitted from the transmission apparatus 10 over multiple symbol periods T including the whole packet data as a transmission unit. When an OFDM symbol is received at a given timing, a soft-decision value is demodulated and interleaved from a signal received during the symbol period. Even though the OFDM symbol is interfered, soft-decision values are distributed to the entire packet and do not concentrate on a point.

Even when a received signal is interfered with, the communication system according to the present embodiment can allow the Viterbi decoder 31 to appropriately perform decoding and improve the communication quality.

The communication system according to the present embodiment calculates the evaluation value $C_c[l]$ used for determination of the interference based on the sampling values $r^I_q[k]$ and $r^Q_q[k]$ for baseband signals repeatedly detected during the symbol period T.

The communication system according to the present embodiment eliminates the need to add a special circuit for detecting interference occurrence and can simplify the apparatus configuration. The system can detect not only periodically occurring interference but also randomly occurring interference. The system can prevent an influence of a momentary abnormal value such as noise compared to a technology of determining an interference occurrence based on a momentary reception level. The system can improve accuracy of determining the interference occurrence.

Other Embodiments

While a preferred embodiment of the present invention has been described herein, it is to be distinctly understood that the present invention is not limited thereto but may be variously embodied in accordance with the invention.

According to the present embodiment, for example, one decision value $th_c$ is assigned to the evaluation value Cc[l] and one value is assigned to the weight count $\gamma_c$. There may be provided multiple decision values. Multiple values may be assigned to the weight count $\gamma_c$.

According to the present embodiment, the level detector 28 finds the evaluation value Cc[l] by counting the number of times the data $r^I_q[k]$ and $r^Q_q[k]$ are clipped in units of OFDM symbols. When the evaluation value is greater than or equal to the predetermined decision value $th_c$, the weighting control section 29 multiplies the weighting factor $\gamma_c$ by the soft-decision value $w_{l,m,n}$. As shown in FIG. 8A, for example, the level detector 28 may calculate an average data amplitude in units of OFDM symbols. As shown in FIG. 8B, the weighting control section 29 may use a predetermined table listing correspondence between the average amplitude a signal level Ix, where x is 1, 2, and so on, and a weight count γx for the level and configure the weight count γx based on the table.

It should be noted that, while the present embodiment describes a transmission made in accordance with OFDM, the exemplary transmission can also be made without using OFDM. In the present case, as shown in FIG. 9, a transmission apparatus 10a is provided with a filter 54 instead of the OFDM modulator 14. The filter 54 performs waveform shaping on a primary modulation symbol, such as a $2^N$ QAM symbol in the present example, generated from the mapper 13. The symbol is then supplied to the DAC 15.

A reception apparatus 20a is provided with a QAM demodulator 56 instead of the OFDM demodulator 26. The QAM demodulator 56 demodulates data $r^I_q[k]$ and $r^Q_q[k]$ sampled by the ADC 25. An output from QAM demodulator 56 is supplied to the demapper 27. The reception apparatus 20a varies the weight count in units of predetermined time intervals Tcount, not OFDM symbols.

The level detector 28 according to the present embodiment uses an output from the ADC 25. The reception apparatus 20a may be configured to detect an analog signal's level previous to the ADC 25.

The level detector 28 according to the present embodiment uses an evaluation value equivalent to the number of pieces of clipped data contained in the symbol. As shown in equations (EQ. 12) and (EQ. 13), the evaluation value may be equivalent to the number of pieces of data that is contained in the symbol and has an amplitude value exceeding a predetermined value $a_l$.

$$e_l[k] = \begin{cases} 1 & |r^I_q[k]| > a_1 \text{ and } |r^Q_q[k]| > a_1 \\ 0 & \text{otherwise} \end{cases} \quad \text{(EQ. 12)}$$

$$C_l[k] = \sum_{k=0}^{K_S-1} e_l[k + lK_S] \quad \text{(EQ. 13)}$$

According to the present embodiment, the modulation uses $2^N$ QAM but is not limited thereto. The modulation may use $2^N$ PSk, for example.

What is claimed is:

1. A method of receiving a signal generated by modulating, according to a modulation procedure, a data string coded with an error correction code and interleaved for each packet as a transmission unit so that one symbol represents one of a bit and a plurality of bits, the method comprising:
   demodulating the received signal and generating a soft-decision value used for decoding the error correction code;
   de-interleaving the soft-decision value;
   decoding the error correction code using the de-interleaved soft-decision value;
   calculating an evaluation value for evaluating a reception level of the received signal detected more than once during a predetermined measurement time based on the reception level; and
   correcting the soft-decision value generated at the operation of demodulating the received signal to decrease a contribution to the decoding of the error correction code when the evaluation value indicates an occurrence of interference,
   wherein the soft-decision value is interleaved across a plurality of symbol periods with different timings, and
   wherein the operation of de-interleaving the soft-decision value de-interleaves the soft-decision value across the plurality of symbol periods.

2. The method according to claim 1, wherein the modulation procedure includes a quadrature amplitude modulation (QAM) procedure.

3. The method according to claim 1, wherein the modulation procedure includes a quadrature phase shift keying (QPSK) modulation procedure.

4. The method according to claim 1, wherein the signal is transmitted according to a orthogonal frequency division multiplexing (OFDM) transmission procedure.

5. An apparatus for receiving a signal generated by modulating, according to a modulation procedure, a data string coded with an error correction code and interleaved for each packet as a transmission unit so that one symbol represents one of a bit and a plurality of bits, the apparatus comprising:

means for demodulating a received signal and generating a soft-decision value used for decoding the error correction code;

means for de-interleaving a soft-decision value generated by the means for demodulating;

means for decoding the error correction code using a soft-decision value de-interleaved by the means for de-interleaving;

means for calculating an evaluation value for evaluating a reception level of the received signal detected more than once during a predetermined measurement time based on the reception level; and means for correcting a soft-decision value generated by the means for demodulating to decrease contribution of the error correction code to decoding when an evaluation value calculated by the means for calculating an evaluation value indicates an interference occurrence, wherein the means for de-interleaving de-interleaves a data string that is interleaved across a plurality of symbol periods with different timings.

6. The reception apparatus of claim 5, wherein the means for de-interleaving specifies a number of the plurality of symbol periods so as to include the entire packet for de-interleaving.

7. The reception apparatus of claim 5, wherein the means for calculating further includes a reception level evaluation means for finding an evaluation value equivalent to a ratio at which the reception level detected during the measurement time exceeds a predetermined threshold value.

8. The reception apparatus of claim 5, wherein the means for calculating further includes a reception level evaluation means for finding an evaluation value equivalent to an average value for the reception level detected during the measurement time.

9. The reception apparatus of claim 5, wherein the means for calculating further includes a reception level evaluation means for configuring a first sample count for the reception level detected during the measurement time to an integral multiple of a second sample count needed for demodulation in the demodulation means.

10. The reception apparatus of claim 5, wherein the means for correcting determines an occurrence of interference when the evaluation value is greater than or equal to a predetermined interference decision value.

11. The reception apparatus of claim 5, wherein the means for correcting corrects the soft-decision value by multiplying the soft-decision value by a weighting factor.

12. The reception apparatus of claim 11, wherein the means for correcting varies the weighting factor in accordance with a table specifying a correspondence between the evaluation value and the weighting factor.

13. The reception apparatus of claim 5, wherein the means for correcting corrects the soft-decision value during each of the symbol periods.

14. The reception apparatus of claim 5, wherein the modulation procedure includes an orthogonal frequency-division multiplex (OFDM) modulation procedure using up to M subcarriers, where M is an integer greater than or equal to 2, and the demodulation means demodulates the received signal, the received signal modulated for transmission according to the OFDM procedure.

15. The reception apparatus of claim 5, wherein the demodulation means demodulates a received signal, the received signal modulated for transmission according to one of a quadrature amplitude modulation and a phase modulation based on $2^N$ symbol points, where N is a positive integer.

16. An article of manufacture comprising a computer readable storage medium, the computer readable storage medium carrying instructions readable by a processor, the instructions, when read and executed, for causing the processor to:

demodulate a received signal associated with a transmitted packet, the received signal generated by modulating, according to a modulation procedure, a data string coded with an error correction code, and interleaving the data string;

generate a soft-decision string used for decoding the error correction code;

de-interleave the soft-decision string;

decode the error correction code using the de-interleaved soft-decision string;

calculate an evaluation value for evaluating a reception level of the received signal detected more than once during a predetermined measurement time based on the reception level; and correct the soft-decision string generated at the demodulating operation to decrease a contribution to the decoding of the error correction code when the evaluation value indicates an occurrence of interference, wherein the soft-decision string is interleaved across a plurality of symbol periods with different timings, and the de-interleaving operation de-interleaves the soft-decision string across the plurality of symbol periods.

17. The article of manufacture according to claim 16, wherein the computer readable storage medium includes a computer readable storage medium.

18. The article of manufacture according to claim 17, wherein the computer readable storage medium includes one of a compact disc(CD) memory, a magnetic disk memory, a flash memory, and a universal serial bus (USB) memory.

19. The article of manufacture according to claim 16, wherein the computer readable storage medium includes a network.

* * * * *